United States Patent
He et al.

(10) Patent No.: US 12,456,923 B2
(45) Date of Patent: Oct. 28, 2025

(54) SWITCHED-INDUCTOR POWER CONVERTER, COMMUNICATION SYSTEM, AND METHOD COUPLED WITH LEAKAGE INDUCTOR

(71) Applicant: Huawei Digital Power Technologies Co., Ltd., Shenzhen (CN)

(72) Inventors: Zhengyan He, Nuremberg (DE); Jiebin Cheng, Dongguan (CN); Chao Wu, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 315 days.

(21) Appl. No.: 18/071,358

(22) Filed: Nov. 29, 2022

(65) Prior Publication Data

US 2023/0097153 A1     Mar. 30, 2023

Related U.S. Application Data

(63) Continuation of application No. PCT/CN2020/093115, filed on May 29, 2020.

(51) Int. Cl.
  *H02M 3/158*   (2006.01)
  *H02M 1/00*    (2007.01)
  *H02M 3/155*   (2006.01)

(52) U.S. Cl.
  CPC ....... *H02M 3/1582* (2013.01); *H02M 1/0051* (2021.05); *H02M 3/1552* (2021.05); *H02M 1/0043* (2021.05)

(58) Field of Classification Search
  CPC ............ H02M 1/0048; H02M 1/0051; H02M 1/0054; H02M 1/0058; H02M 3/158; H02M 3/156; H02M 3/1586
  See application file for complete search history.

(56) References Cited

U.S. PATENT DOCUMENTS

| | | | | |
|---|---|---|---|---|
| 5,457,379 A * | 10/1995 | Jacobs | ................. | H02M 3/158 323/222 |
| 5,880,940 A * | 3/1999 | Poon | ...................... | H02M 1/34 323/224 |
| 7,596,007 B2 * | 9/2009 | Phadke | ................. | H02M 3/285 363/71 |

(Continued)

FOREIGN PATENT DOCUMENTS

| CN | 103580492 A | 2/2014 |
|---|---|---|
| CN | 103580493 A | 2/2014 |

(Continued)

*Primary Examiner* — Gustavo A Rosario-Benitez
(74) *Attorney, Agent, or Firm* — Leydig, Voit & Mayer, Ltd.

(57) ABSTRACT

This application discloses a switched-inductor power converter, a communication system, and a method. The switched-inductor power converter includes a coupling winding and a unidirectional conduction circuit, and the coupling winding and the unidirectional conduction circuit are connected in series to form a closed loop. A leakage inductor is formed after the coupling winding and a power inductor are magnetically coupled. Existence of the leakage inductor and the unidirectional conduction circuit may suppress a reverse recovery stress of a first diode, to further reduce a reverse recovery current of the first diode, and reduce a reverse recovery loss of the first diode.

20 Claims, 13 Drawing Sheets

(56) References Cited

U.S. PATENT DOCUMENTS

| | | | |
|---|---|---|---|
| 2007/0230228 A1* | 10/2007 | Mao | H02M 3/1588 |
| | | | 363/89 |
| 2008/0031016 A1* | 2/2008 | Lin | H02M 1/4225 |
| | | | 363/21.03 |
| 2013/0039099 A1* | 2/2013 | Wu | H02J 50/12 |
| | | | 363/40 |
| 2016/0314914 A1* | 10/2016 | Li | H02M 3/158 |
| 2017/0237332 A1* | 8/2017 | Takahashi | H02M 1/083 |
| | | | 323/235 |
| 2019/0052168 A1* | 2/2019 | Bhandarkar | H03K 17/133 |
| 2019/0267895 A1* | 8/2019 | Masuda | H02M 3/155 |
| 2020/0169180 A1* | 5/2020 | Jitaru | H02M 3/33592 |
| 2021/0091653 A1* | 3/2021 | He | H02M 1/00 |

FOREIGN PATENT DOCUMENTS

| | | |
|---|---|---|
| EP | 1249924 A2 | 10/2002 |
| WO | 2019233414 A1 | 12/2019 |

* cited by examiner

SWITCHED-INDUCTOR POWER CONVERTER, COMMUNICATION SYSTEM, AND METHOD COUPLED WITH LEAKAGE INDUCTOR

CROSS-REFERENCE TO RELATED APPLICATIONS

This application is a continuation of International Application No. PCT/CN2020/093115, filed on May 29, 2020, the disclosure of which is hereby incorporated by reference in its entirety.

TECHNICAL FIELD

Embodiments of this application relate to the field of power electronics technologies, and in particular, to a switched-inductor power converter, a communication system, and a method.

BACKGROUND

Currently, a power supply of a communication system usually includes a direct current-direct current DC-DC power converter. The following provides descriptions by using a buck-boost circuit in the DC-DC power converter as an example.

FIG. 1 is a diagram of a topology of a buck-boost circuit.

An operating principle of this circuit is as follows: In each switching cycle of a main switch Q1, when the main switch Q1 is closed, a power inductor L1 stores energy based on an input voltage Vin of a power supply; and when Q1 is open, L1 is disconnected from the power supply, and L1 releases energy by using a diode D1, to provide an output voltage Vout to a load, so as to transfer the energy from an input terminal to an output terminal. Based on a flow direction of a current in L1, it can be learned that Vout and Vin have opposite directions.

However, in actual operation, at a moment at which Q1 is closed, Vin and Vout are simultaneously applied to two terminals of D1. Therefore, there is a voltage difference of Vout+Vin between the two terminals of D1, and D1 has a large reverse recovery loss due to Vout+Vin in a reverse recovery process of D1. To resolve the problem, the following two solutions are proposed in the conventional technology.

First Solution:

FIG. 2 is a diagram of a topology of another buck-boost circuit.

In the buck-boost circuit, a unidirectional conduction branch is connected to two terminals of the power inductor L1 in parallel, and the unidirectional conduction branch includes a switching transistor Q3 and a diode D2 that are connected in series. Before Q1 is closed, a controller controls Q3 to be conducted first, to conduct the unidirectional conduction branch. When the unidirectional conduction branch is conducted, the unidirectional conduction branch and L1 form a closed loop, and energy stored in L1 is released through the unidirectional conduction branch, to reduce a reverse recovery voltage between two terminals of D1, so as to reduce a reverse recovery loss of D1.

Second Solution:

FIG. 3 is a diagram of a topology of still another buck-boost circuit.

In the buck-boost circuit, a unidirectional conduction circuit and an inductor L3 are added. The unidirectional conduction circuit includes: a switching transistor Q3 and a diode D2 that are connected in series. The unidirectional conduction circuit and L3 are connected in series to form a closed loop, and L1 and L3 are magnetically coupled in parallel. Before Q1 is closed, a controller controls the switching transistor Q3 to be conducted, to conduct the unidirectional conduction circuit. When the unidirectional conduction circuit is conducted, two terminals of L1 are short-circuited by using L3, energy stored in L1 is transferred to L3 for storage, and a voltage applied to D1 by L1 is reduced, to reduce a reverse recovery current of D1, and reduce a reverse recovery loss of D1.

In circuits in the two solutions, a reverse recovery problem of D1 is resolved, but zero voltage switching of Q1 cannot be implemented.

SUMMARY

This application provides a switched-inductor power converter, a communication system, and a method, to not only resolve a reverse recovery problem of a diode, but also implement zero voltage switching of a main switch.

According to a first aspect, this application provides a switched-inductor power converter. The switched-inductor power converter includes a coupling winding and a unidirectional conduction circuit, and the coupling winding and the unidirectional conduction circuit are connected in series to form a closed loop. A leakage inductor is formed after the coupling winding and a power inductor are magnetically coupled. Existence of the leakage inductor and the unidirectional conduction circuit may suppress a reverse recovery stress of a first diode, to further reduce a reverse recovery current of the first diode, and reduce a reverse recovery loss of the first diode. In addition, the leakage inductor may resonate with a parasitic capacitor of a main switch and/or a parasitic capacitor of the first diode, so that a voltage difference between two terminals of the main switch is close to 0 V, to implement zero voltage switching of the main switch, and effectively reduce a loss of the main switch. Therefore, the converter may not only be used to reduce a reverse recovery loss of a diode, but also be used to implement zero voltage switching of the main switch.

Specifically, the switched-inductor power converter includes: a main switch, a power inductor, a coupling winding, a unidirectional conduction circuit, a first diode, and a controller. When the main switch is closed, the power inductor stores energy from a power supply; when the main switch is open, the power inductor is disconnected from the power supply to release energy; and the first diode provides a freewheeling path when the power inductor releases the energy. The coupling winding and the power inductor are magnetically coupled, and a leakage inductor is formed after the coupling winding and the power inductor are magnetically coupled. Existence of the leakage inductor may suppress a reverse stress of a first diode, to further reduce a reverse recovery current of the first diode, and reduce a reverse recovery loss of the first diode. A first terminal of the unidirectional conduction circuit is connected to a first terminal of the coupling winding, a second terminal of the unidirectional conduction circuit is connected to a second terminal of the coupling winding, and one terminal that is of the power inductor and that is connected to a positive electrode of the power supply and the first terminal of the coupling winding are dotted terminals. The controller is configured to: in each switching cycle of the main switch, control the unidirectional conduction circuit to be broken before the main switch is open, and is further configured to control the unidirectional conduction circuit to be conducted before the main switch is closed, so that a reverse recovery of the first diode is completed before the main switch is closed, where a direction of a current existing when the unidirectional conduction circuit is conducted is that the current flows out from the second terminal of the coupling winding. Existence of the unidirectional conduction circuit may also suppress a reverse recovery stress of the first diode, to further reduce a reverse recovery current of the first diode, and reduce a reverse recovery loss of the first diode. In addition, the leakage inductor resonates with the parasitic capacitor of the main switch and/or the parasitic capacitor of the first diode when the unidirectional conduction circuit is conducted, to implement zero voltage switching of the main switch.

In a first possible implementation of the first aspect, to implement a unidirectional conduction function of the unidirectional conduction circuit, a switching transistor and a second diode that are connected in series are disposed in the unidirectional conduction circuit; a positive electrode of the second diode is close to the second terminal of the coupling winding, and a negative electrode of the second diode is close to the first terminal of the coupling winding; and a direction of the second diode and a direction of a parasitic diode of the switching transistor are opposite, and the negative electrode of the second diode is close to the first terminal of the coupling winding. Therefore, after the controller controls the switching transistor to be conducted, when the unidirectional conduction circuit is conducted, the second diode may prevent a current output by the first terminal of the coupling winding. Because the switching transistor is controllable, the controller may control the main switch by using a pulse drive signal, and further control the unidirectional conduction circuit to be conducted and broken.

With reference to the first possible implementation of the first aspect, in a second possible implementation, a first terminal of the switching transistor is connected to the first terminal of the coupling winding, a second terminal of the switching transistor is connected to the negative electrode of the second diode, and the positive electrode of the second diode is connected to the second terminal of the coupling winding. The controller may control the main switch to be closed and open, and further control the unidirectional conduction circuit to be conducted and broken.

With reference to the second possible implementation of the first aspect, in a third possible implementation, the switched-inductor power converter is a non-isolated converter. Because the unidirectional conduction circuit is a completely independent islanding circuit, to help control the unidirectional conduction circuit, a connection manner of the switching transistor may be selected, so as to drive the switching transistor more easily. Specifically, the first terminal of the switching transistor is grounded, so that a source electrode of the switching transistor and the controller are connected to a same ground, to simplify a pulse drive signal of the switching transistor, and drive the switching transistor more easily.

With reference to the second possible implementation of the first aspect, in a fourth possible implementation, the switched-inductor power converter is a non-isolated converter, and the switching transistor and the main switch are connected to a same ground, so that the switching transistor and the main switch share one controller. Therefore, the controller may directly multiplex a pulse drive signal of the main switch to drive the switching transistor, and a pulse drive signal does not need to be additionally added.

With reference to the second possible implementation of the first aspect, in a fifth possible implementation, in order that in each switching cycle of the main switch, the controller controls the unidirectional conduction circuit to be broken before the main switch is open and controls the unidirectional conduction circuit to be conducted before the main switch is closed, a pulse drive signal of the switching transistor and a pulse drive signal of the main switch are both set to have a same period and duty cycle, and compared with the pulse drive signal of the switching transistor, the pulse drive signal of the main switch is delayed for a preset time period. Therefore, the controller may control a sequence of conducting the unidirectional conduction circuit and closing the main switch, or may control a sequence of breaking the unidirectional conduction circuit and opening the main switch.

With reference to the fifth possible implementation of the first aspect, in a sixth possible implementation, to reduce a design of an auxiliary pulse drive signal, a delay circuit is added to the converter. The delay circuit may delay the pulse drive signal of the switching transistor for the preset time period, to provide the pulse drive signal to the main switch, so that the switching transistor can be driven without a need to design the auxiliary pulse drive signal.

With reference to the fifth possible implementation or the sixth possible implementation of the first aspect, in a seventh possible implementation, a ratio of inductance of the leakage inductor to inductance of a magnetically coupled excitation inductor is less than 10%, and a time period existing after the unidirectional conduction circuit is conducted and before the main switch is closed is less than or equal to 5% of the switching cycle.

With reference to any one of the first aspect and the possible implementations, in an eighth possible implementation, the switched-inductor power converter may include any one of the following circuits: a buck circuit, a boost circuit, a buck-boost circuit, a Cuk circuit, a Sepic circuit, and a Zeta circuit.

With reference to the second possible implementation of the first aspect, in a ninth possible implementation, when the switched-inductor power converter is an isolated converter, the switched-inductor power converter includes an isolation transformer; and the first terminal of the switching transistor is connected to the ground of a primary-side winding of the isolation transformer, so that the switching transistor and the main switch share one controller. Therefore, a pulse drive signal does not need to be additionally added, and design complexity is reduced.

With reference to the second possible implementation of the first aspect, in a tenth possible implementation, when the switched-inductor power converter is an isolated converter, the switched-inductor power converter includes an isolation transformer; and the first terminal of the switching transistor is connected to the ground of a secondary-side winding of the isolation transformer, so that the source electrode of the switching transistor and the controller are connected to a same ground, to simplify the pulse drive signal of the switching transistor, and drive the switching transistor more easily.

With reference to ninth possible implementation or the tenth possible implementation of the first aspect, in an eleventh possible implementation, the isolated converter includes any one of the following circuits: a flyback circuit, a forward circuit, a half-bridge circuit, a full-bridge circuit, and a push-pull circuit.

With reference to any one of the first aspect and the possible implementations, in a twelfth possible implementation, the power inductor is any one of the following types: a planar inductor, a discrete inductor, and a multi-phase coupled inductor.

Based on the switched-inductor power converter provided in this embodiment, an embodiment of this application further provides a communication system.

According to a second aspect, this application provides a communication system, to reduce an energy loss generated in a power supply process of the communication system, and improve power supply efficiency of the communication system. The communication system includes a remote radio unit RRU and the switched-inductor power converter provided in the first aspect of this application. A positive electrode of the converter is connected to a positive electrode of a power supply, a negative electrode of the converter is connected to a negative electrode of the power supply, the positive electrode of the power supply is the ground, and the negative electrode of the power supply is configured to provide a negative voltage. An output terminal of the converter is configured to supply power to the RRU. A leakage inductor is formed after a coupling winding and a power inductor in the converter are magnetically coupled. A coupling relationship between the coupling winding and the power inductor is set, to obtain a ratio between inductance of the leakage inductor and inductance of a magnetically coupled excitation inductor, further control a reverse recovery speed and a magnitude of a recovery current of the diode, so as to reduce a reverse recovery loss of a first diode. The leakage inductor may resonate with a parasitic capacitor of a main switch and/or a parasitic capacitor of the first diode, so that a voltage difference between two terminals of the main switch is close to 0 V, to implement zero voltage switching of the main switch, and effectively reduce a loss of the main switch. Therefore, when the communication system including the converter is used to supply power to the remote radio unit, the energy loss generated in the power supply process of the communication system can be reduced, and the power supply efficiency of the communication system can be improved.

In a first possible implementation of the second aspect, the coupling winding and the power inductor in the converter are magnetically coupled by using a magnetic core; and each phase of the power supply includes one converter. To reduce a volume of the power supply and reduce occupied space of the power supply, converters of all phases share a same magnetic core.

With reference to the first possible implementation of the second aspect, in a second possible implementation, to suppress a ripple of a current output by the power supply and improve quality of power supplied to the RRU, phases are sequentially preset for negative voltages connected to all phases of the power supply in a phase-shifted manner.

According to a third aspect, this application provides a control method for a switched-inductor power converter. The method is applied to the converter, and the method includes:

in each switching cycle of a main switch, controlling a unidirectional conduction circuit to be broken before the main switch is open; and controlling the unidirectional conduction circuit to be conducted before the main switch is closed, so that a reverse recovery of a first diode is completed before the main switch is closed, where a direction of a current existing when the unidirectional conduction circuit is conducted is that the current flows out from a second terminal of a coupling winding.

In the control method, the unidirectional conduction circuit is broken before the main switch is open, and the unidirectional conduction circuit is conducted before the main switch is closed. The unidirectional conduction circuit may be used to resolve a reverse recovery problem that is of a diode and that exists before the main switch is closed. A leakage inductor is formed after the coupling winding and a power inductor are magnetically coupled. Existence of the leakage inductor and the unidirectional conduction circuit may suppress a reverse recovery stress of the first diode, to further reduce a reverse recovery current of the first diode, and reduce a reverse recovery loss of the first diode. In addition, the leakage inductor resonates with a junction capacitor of the main switch, and/or the leakage inductor resonates with a junction capacitor of the diode, to implement zero voltage switching of the main switch. Therefore, the converter may not only be used to reduce a reverse recovery loss of a diode, but also be used to implement zero voltage switching of the main switch.

According to the foregoing technical solutions, it can be learned that embodiments of this application have the following advantages.

The switched-inductor power converter includes: the main switch, the power inductor, the coupling winding, the unidirectional conduction circuit, the first diode, and the controller. When the main switch is closed, the power inductor stores energy from the power supply; when the main switch is open, the power inductor is disconnected from the power supply, to release energy; and the first diode provides the freewheeling path when the power inductor releases the energy. The coupling winding and the power inductor are magnetically coupled, and the leakage inductor is formed after the coupling winding and the power inductor are magnetically coupled. The first terminal of the unidirectional conduction circuit is connected to the first terminal of the coupling winding, the second terminal of the unidirectional conduction circuit is connected to the second terminal of the coupling winding, and one terminal that is of the power inductor and that is connected to the positive electrode of the power supply and the first terminal of the coupling winding are dotted terminals. In each switching cycle of the main switch, the controller is configured to control the unidirectional conduction circuit to be broken before the main switch is open, and is further configured to control the unidirectional conduction circuit to be conducted before the main switch is closed, so that the reverse recovery of the first diode is completed before the main switch is closed, where the direction of the current existing when the unidirectional conduction circuit is conducted is that the current flows out from the second terminal of the coupling winding. When the unidirectional conduction circuit is conducted, the leakage inductor is configured to resonate with the parasitic capacitor of the main switch and/or the parasitic capacitor of the first diode, to implement zero voltage switching of the main switch.

In the technical solutions of this application, the leakage inductor is formed after the coupling winding and the power inductor are magnetically coupled. Existence of the leakage inductor and the unidirectional conduction circuit may suppress the reverse recovery stress of the first diode, to further reduce the reverse recovery current of the first diode, and reduce the reverse recovery loss of the first diode. In addition, the leakage inductor may resonate with the parasitic capacitor of the main switch and/or the parasitic capacitor of the first diode, so that the voltage difference between the two terminals of the main switch is close to 0 V, to implement zero voltage switching of the main switch, and effectively reduce the loss of the main switch.

DESCRIPTION OF EMBODIMENTS

The following describes the technical solutions in embodiments of this application with reference to the accompanying drawings in embodiments of this application. It is clear that the described embodiments are merely a part rather than all of embodiments of this application.

A specific type of a switched-inductor power converter is not specifically limited in embodiments of this application, and may be specifically a non-isolated converter or an isolated converter.

The non-isolated converter includes any one of the following circuits: a buck circuit, a boost circuit, a buck-boost circuit, a Cuk circuit, a Sepic circuit, and a Zeta circuit.

The isolated converter includes any one of the following circuits: a flyback circuit, a forward circuit, a half-bridge circuit, a full bridge circuit, and a push-pull circuit.

A specific application scenario of the foregoing various switched-inductor power converters is not specifically limited in embodiments of this application. For example, the switched-inductor power converter is applicable to each power supply scenario to which a DC-DC power converter is applied in various technical fields, for example, a communication power supply, an uninterruptible power supply, and an automobile charger.

For ease of description, the following provides detailed descriptions by using an example in which the type of the switched-inductor power converter is a buck-boost circuit. For ease of description, the switched-inductor power converter is briefly referred to as a converter below.

The converter provided in embodiments of this application includes a coupling winding and a unidirectional conduction circuit, and the coupling winding and the unidirectional conduction circuit are connected in series to form a closed loop. A leakage inductor is formed after the coupling winding and a power inductor are magnetically coupled. Existence of the leakage inductor and the unidirectional conduction circuit may suppress a reverse recovery stress of a first diode, to further reduce a reverse recovery current of the first diode, and reduce a reverse recovery loss of the first diode. In addition, the leakage inductor may resonate with a parasitic capacitor of a main switch and/or a parasitic capacitor of the first diode, so that a voltage difference between two terminals of the main switch is close to 0 V, to implement zero voltage switching of the main switch, and effectively reduce a loss of the main switch. Therefore, the converter may not only be used to reduce a reverse recovery loss of a diode, but also be used to implement zero voltage switching of the main switch.

Figure 4:
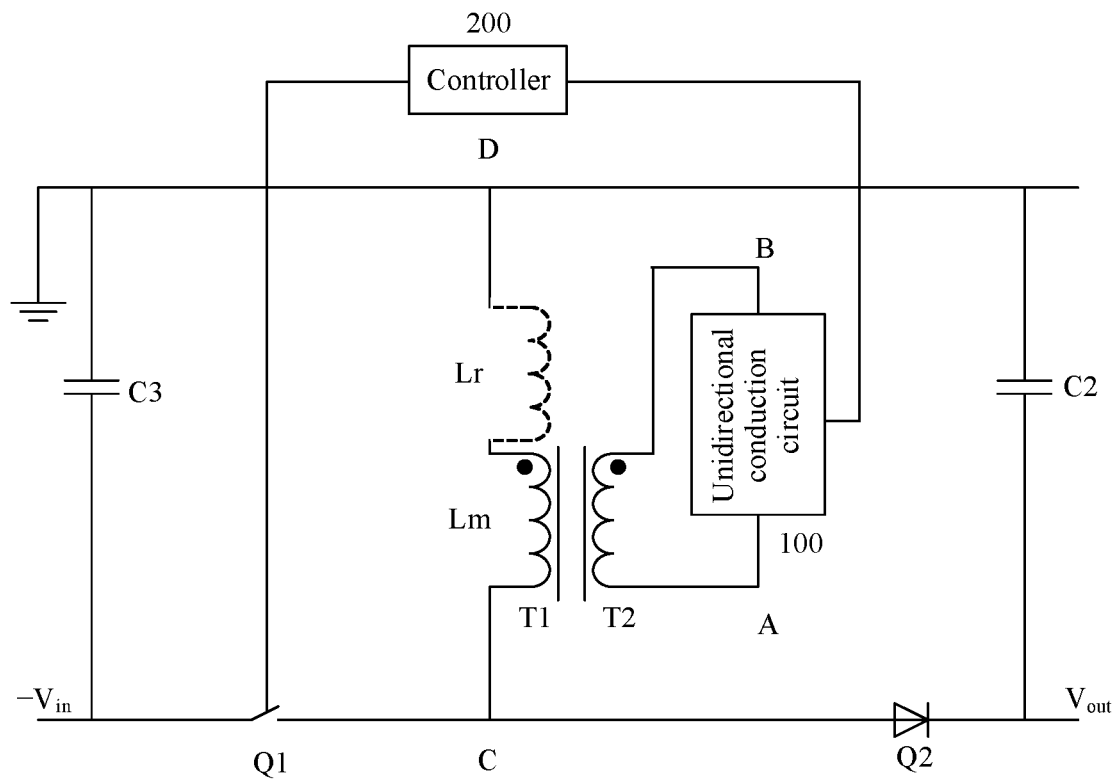
FIG. 4 is a diagram of a circuit topology of a switched-inductor power converter according to an embodiment of this application.

Embodiment 1 of a Switched-Inductor Power Converter:

FIG. 4 is a diagram of a circuit topology of a switched-inductor power converter according to an embodiment of this application.

In this embodiment, a buck-boost circuit is described as an example. The converter includes: a main switch Q1, a power inductor T1, a coupling winding T2, a unidirectional conduction circuit 100, a first diode Q2, and a controller 200.

A first terminal of Q1 is connected to a negative electrode of a power supply, and a second terminal of Q1 is connected to a second terminal of T1.

A positive electrode of the power supply is grounded, and the negative electrode of the power supply is connected to a negative voltage -Vin.

A positive electrode of Q2 is connected to an output terminal Vout, and a negative electrode of Q2 is connected to the second terminal of T1.

An input terminal of the buck-boost circuit is connected to a capacitor C3 in parallel, and C3 is configured to filter an input voltage.

An output terminal of the buck-boost circuit is connected to a capacitor C2 in parallel, and C2 is configured to filter an output voltage.

T1 may be any one of the following types: a planar inductor, a discrete inductor, and a multi-phase coupled inductor.

Q1 is a controllable switching transistor. To be specific, Q1 needs to be closed and open by using a pulse drive signal. Q2 usually may be an uncontrollable diode, and does not need to be controlled. A controllable switching transistor may alternatively be used as Q2, to implement an effect of a diode. In other words, Q2 is controlled to implement a unidirectional conduction characteristic of the diode.

When the main switch Q1 is closed, the power inductor T1 stores energy from the power supply; when the main switch Q1 is open, the power inductor T1 is disconnected from the power supply, to release energy; and the first diode Q2 provides a freewheeling path when the power inductor T1 releases the energy. A first terminal of the unidirectional conduction circuit 100 is connected to a first terminal of the coupling winding T2, and a second terminal of the unidirectional conduction circuit 100 is connected to a second terminal of the coupling winding T2; and one terminal that is of the power inductor T1 and that is connected to the positive electrode of the power supply and the first terminal of the coupling winding T2 are dotted terminals.

The coupling winding T2 and the power inductor T1 are magnetically coupled, and a leakage inductor Lr is formed after the coupling winding T2 and the power inductor T1 are magnetically coupled. A ratio of inductance of the leakage inductor Lr to inductance of a magnetically coupled excitation inductor Lm is less than 10%. The excitation inductor Lm is an inductor including T1 when T2 is open-circuited, or Lm is an excitation inductor that is observed from a side of T1 when T1 and T2 are coupled.

Lr is configured to resonate with a parasitic capacitor of the main switch Q1 and/or a parasitic capacitor of the first diode Q2 when the unidirectional conduction circuit 100 is conducted, to implement zero voltage switching of the main switch Q1.

Because the ratio of the inductance of Lr to the inductance of Lm is less than 10%, Lr may be considered as an inductor with small inductance. Therefore, when the unidirectional conduction circuit 100 is conducted, Lr may resonate with the parasitic capacitor of Q1 and/or the parasitic capacitor of Q2, to implement zero voltage switching of Q1.

For ease of understanding, Lr and T1 are located on a same side. As shown in the figure, Lr and Lm are connected in series, and then are connected to two terminals of C3 in parallel.

In each switching cycle of the main switch Q1, the controller 200 is configured to control the unidirectional conduction circuit 100 to be broken before the main switch Q1 is open, and is further configured to control the unidirectional conduction circuit 100 to be conducted before the main switch Q1 is closed, so that a reverse recovery of the first diode Q2 is completed before the main switch Q1 is closed. A direction of a current existing when the unidirectional conduction circuit 100 is conducted is that the current flows out from the second terminal of the coupling winding.

The direction existing when the unidirectional conduction circuit 100 is conducted is specifically that the current flows from a point A to a point B through the unidirectional conduction circuit 100, and a case in which the current flows from the point B to the point A through the unidirectional conduction circuit 100 is not allowed.

That the unidirectional conduction circuit 100 is broken is that a part between the point A and the point B is in a high impedance state. Specifically, impedance of an impedance part between the point A and the point B is greater than first preset impedance, and the first preset impedance may be set based on an actual requirement, for example, may be 10000 ohms.

That the unidirectional conduction circuit 100 is conducted is that a path between the point A and the point B is in a unidirectional low impedance state. Specifically, impedance of the impedance part that is from the point A to the point B and that includes the unidirectional conduction circuit 100 is less than second preset impedance. Alternatively, when a current that is in T2 and that is proportionally converted from a current in T1 based on a turn ratio of T1 to T2 is equal to the current flowing from the point A to the point B through the unidirectional conduction circuit 100, a voltage between the point A and the point B is less than a preset voltage. The preset voltage may be set based on an actual requirement, for example, may be 3 V.

To make a person skilled in the art understand an operating principle of the switched-inductor power converter in this application more easily, the following provides descriptions by using one switching cycle of Q1 as an example. A same control manner is used in each switching cycle.

Figure 5:
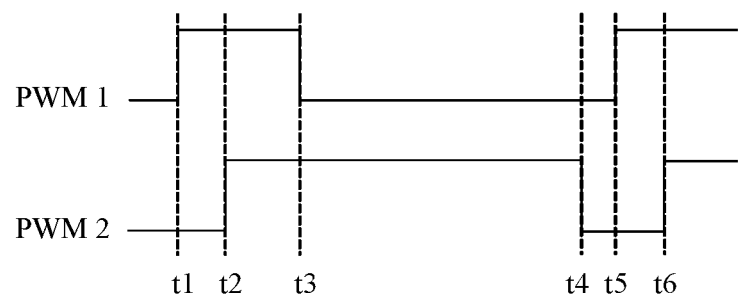
FIG. 5 is a diagram of a time sequence corresponding to FIG. 4 according to an embodiment of this application.

FIG. 5 is a diagram of a time sequence corresponding to FIG. 4 according to an embodiment of this application.

PWM 1 is a pulse drive signal corresponding to Q1, and PWM 2 is a pulse drive signal corresponding to the unidirectional conduction circuit 100.

PWM 1 and PWM 2 have a same period and duty cycle, and compared with PWM 2, PWM 1 is delayed for a time period (t1 to t2). Q1 is closed when PWM 1 is at a high level, and Q1 is open when PWM 1 is at a low level. When PWM 2 is at a high level the unidirectional conduction circuit 100 is broken. In other words, the unidirectional conduction circuit 100 is in a high impedance state. When PWM 2 is at a low level the unidirectional conduction circuit 100 is conducted. In other words, the unidirectional conduction circuit 100 is in a unidirectional low impedance state. With reference to FIG. 4, the unidirectional low impedance state is that a path that is from the point A to the point B and that includes the unidirectional conduction circuit 100 is in a low impedance state.

It can be learned from the diagram of the operating sequence that in one switching cycle of Q1, the unidirectional conduction circuit 100 is conducted before Q1 is closed, and is broken after Q1 is open.

Specifically, at a moment t1, PWM 1 jumps to the high level, a state of Q1 changes to a closed state, and T1 stores energy by using electrical energy from the power supply. At a moment t3, PWM 1 jumps from the high level to the low level, so that the state of Q1 changes to an open state, and T1 transfers energy to the output terminal through Q2. However, at a moment t2 before the moment t3, PWM 2 jumps from the low level to the high level, so that the unidirectional conduction circuit 100 is broken before Q1 is open. At a moment t5, PWM 1 jumps from the low level to the high level, so that the state of Q1 changes to a closed state, and T1 continues to store energy by using the electrical energy from the power supply. However, at a moment t4 before the moment t5, PWM 2 jumps from the high level to the low level, so that the unidirectional conduction circuit 100 is conducted before Q1 is closed. At a moment t6, PWM 2 jumps from the low level to the high level, so that the unidirectional conduction circuit 100 is broken, to prepare for opening Q1 for a next time.

It can be learned from FIG. 5 that compared with PWM 2, a time period for which PWM 1 is delayed is a time period from the moment t4 to the moment t5. For ease of description, the time period is recorded as Δt.

The following describes one switching cycle of Q1 in detail in the following two parts. A first part describes an operating principle of the converter when the unidirectional conduction circuit 100 is conducted. A second part describes an operating principle of the converter when the unidirectional conduction circuit 100 is broken.

First Part:

When the unidirectional conduction circuit 100 is conducted (from the moment t4 to the moment t6), a circuit of the converter shown in FIG. 4 may be equivalently converted.

Figure 6A:
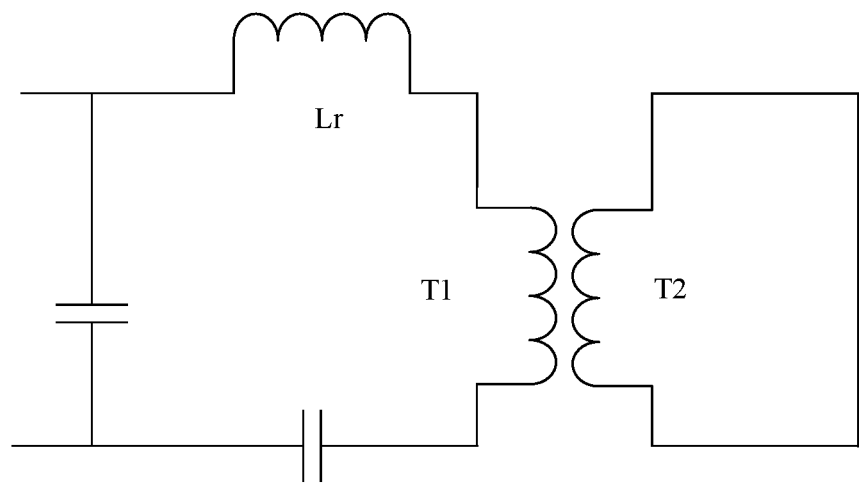
FIG. 6A is a diagram of an equivalent circuit corresponding to FIG. 4.

FIG. 6A is a diagram of an equivalent circuit corresponding to FIG. 4.

The equivalent circuit includes the leakage inductor Lr, the excitation inductor Lm, and the coupling winding T2.

Lm and T2 approximately form an ideal transformer. Because a quantity of turns of Lm and a quantity of turns of T2 are large, inductance of Lm is much greater than inductance of T2, and the diagram of the equivalent circuit may be further equivalently converted.

Figure 6B:
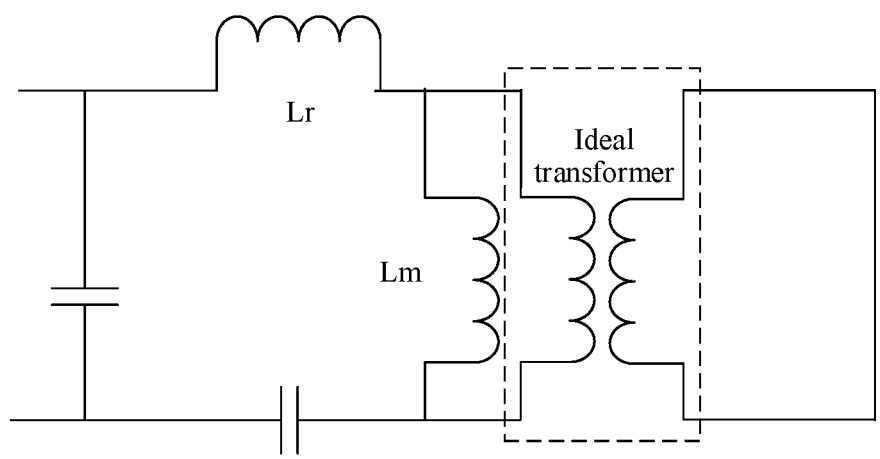
FIG. 6B is a diagram of an equivalent circuit corresponding to FIG. 6A.

FIG. 6A may be equivalent to FIG. 6B. To be specific, T1 and T2 are coupled, to be equivalent to an excitation inductor Lm and an ideal transformer. Because a secondary-side winding of the ideal transformer is short-circuited, a primary-side winding of the ideal transformer is also short-circuited. In this case, FIG. 6B may be equivalent to FIG. 7.

Figure 7:
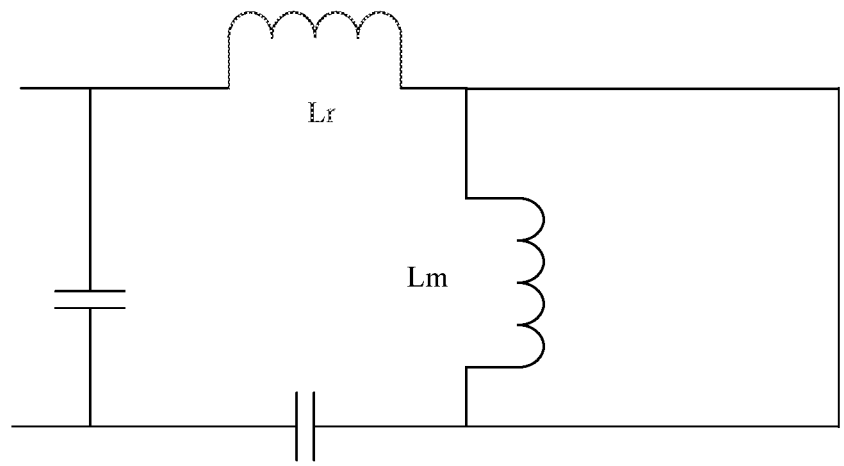
FIG. 7 is a diagram of an equivalent circuit corresponding to FIG. 6B.

FIG. 7 is a diagram of an equivalent circuit corresponding to FIG. 6B.

The equivalent circuit includes the leakage inductor Lr and the excitation inductor Lm. Lr is located on a primary side of the ideal transformer.

With reference to FIG. 4, after the controller 200 controls the unidirectional conduction circuit 100 to be conducted, the path that is from the point A to the point B and that includes the unidirectional conduction circuit 100 is in a unidirectional low impedance state, a voltage at a point C is higher than a voltage at a point D, and a current flows from the point D to the point C through Lm. In this case, energy of a magnetic field is not lost, and the current flowing through Lm is transferred to T2. In this case, Lm is short-circuited by an equivalent unidirectional conduction circuit, so that the diagram of the equivalent circuit may be further equivalently converted.

Figure 8:
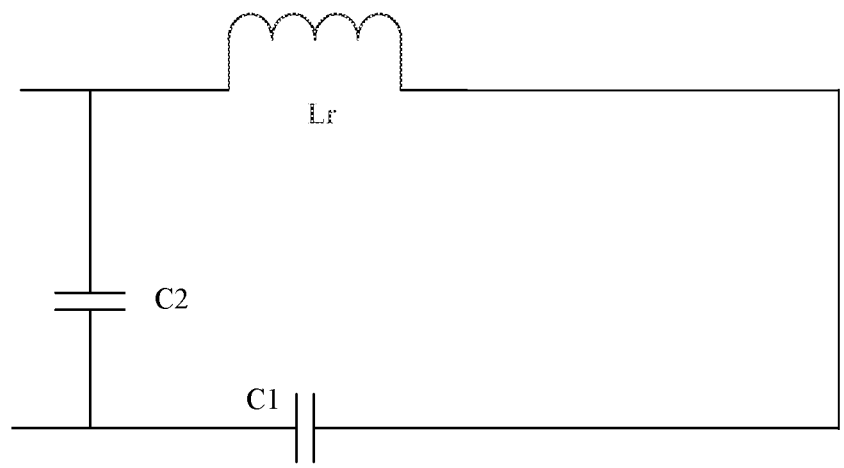
FIG. 8 is a diagram of an equivalent circuit corresponding to FIG. 7.

FIG. 8 is a diagram of an equivalent circuit corresponding to FIG. 7.

With reference to FIG. 4, the equivalent circuit includes the leakage inductor Lr, the capacitor C2, and the capacitor C1. In FIG. 8, the parasitic capacitor of Q1 and the parasitic capacitor of Q2 are considered, and C1 is an equivalent capacitor of the parasitic capacitor of Q1 and the parasitic capacitor of Q2.

With reference to FIG. 4, the output voltage Vout is applied to Lr. Because Lr is far less than Lm, in a short time period tr, a direction of a current flowing through Lr changes, through reverse excitation, from an original direction from the point D to the point C to a direction from the point C to the point D. In other words, the direction of the current of Lr changes. For Q2, a direction of a current flowing through Q2 changes from a direction from the negative electrode of Q2 to the positive electrode of Q2 to a direction from the positive electrode of Q2 to the negative electrode of Q2. Therefore, in tr, for Q2, the direction of the current is from the positive electrode of Q2 to the negative electrode of Q2, and Q2 may start the reverse recovery to a cut-off state in advance. C1 charges Lr, so that energy generated by a reverse recovery current of Q2 is stored in Lr, to reduce a generated reverse recovery loss of Q2.

After tr, the reverse recovery of Q2 is completed, and is in the cut-off state. In this case, a charge still exists on C1, and a stored charge on C1 forms a voltage drop at two terminals of Lr. Therefore, the voltage at the point C is still higher than the voltage at the point D, and there is a voltage difference between C1 and Lr, so that a resonance condition in which Lr and C1 resonate can be met. After the time period tr passes within Δt, the circuit enters a resonance interval. In this case, a voltage between two terminals of Q1 exactly has a maximum value. After a half period, namely, Tlc/2, in other words, when Δt-tr=Tlc/2, the voltage between the two terminals of Q1 reaches a minimum value. Therefore, zero voltage switching of Q1 can be implemented.

After the unidirectional conduction circuit 100 is conducted for a period of time, at the moment t5, the controller 200 controls Q1 to be closed. Before Q1 is closed, the direction of the current flowing through Lr is from the point C to the point D. After Q1 is closed, T1 is connected to the power supply. In this case, the voltage at the point D is higher than the voltage at the point C. Therefore, Lr releases energy to the power supply, and energy required for the reverse recovery of Q2 is almost losslessly released to the power supply, so that an energy loss generated in a reverse recovery process of Q2 can be reduced.

With reference to FIG. 4, after the controller 200 controls Q1 to be closed and Lr releases energy to the power supply, the voltage at the point D is higher than the voltage at the point C, and a voltage at the point B is higher than a voltage at the point A. Because a part that is from the point B to the point A and that includes the unidirectional conduction circuit 100 is in a high impedance state, which is equivalent to that a circuit between the point A and the point B is cut off, no current is generated in T2, so that Lm and Lr that are connected in series can store energy input from the power supply.

After Lm and Lr that are connected in series store energy, the controller 200 controls the unidirectional conduction circuit 100 to be broken, to prepare to control Q1 to be open.

The Following Describes the Second Part:

With reference to the first part and FIG. 4, the controller 200 controls the unidirectional conduction circuit 100 to be broken, and then controls Q1 to be open. In this case, the voltage at the point C is higher than the voltage at the point D, and a current in Lm and Lr that are connected in series flows to the output terminal through Q2, to release energy.

The switched-inductor power converter provided in this application may not only be used to reduce the reverse recovery loss of Q2, but also be used to implement zero voltage switching of Q1.

Figure 1:
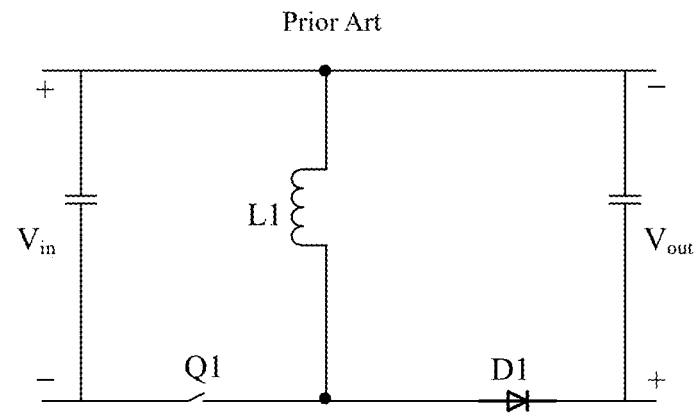
FIG. 1 is a diagram of a topology of a buck-boost circuit.
Figure 2:
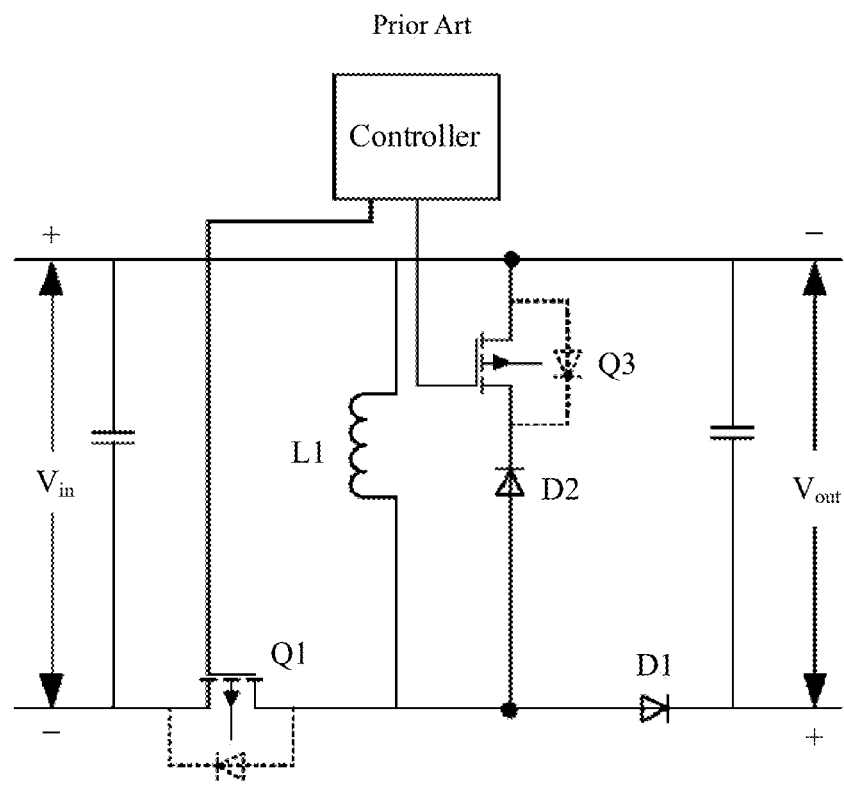
FIG. 2 is a diagram of a topology of another buck-boost circuit.

For FIG. 2, there is no inductive component in the unidirectional conduction branch. Consequently, a resonance circuit cannot be formed, and further, zero voltage switching of Q1 cannot be implemented.

Figure 3:
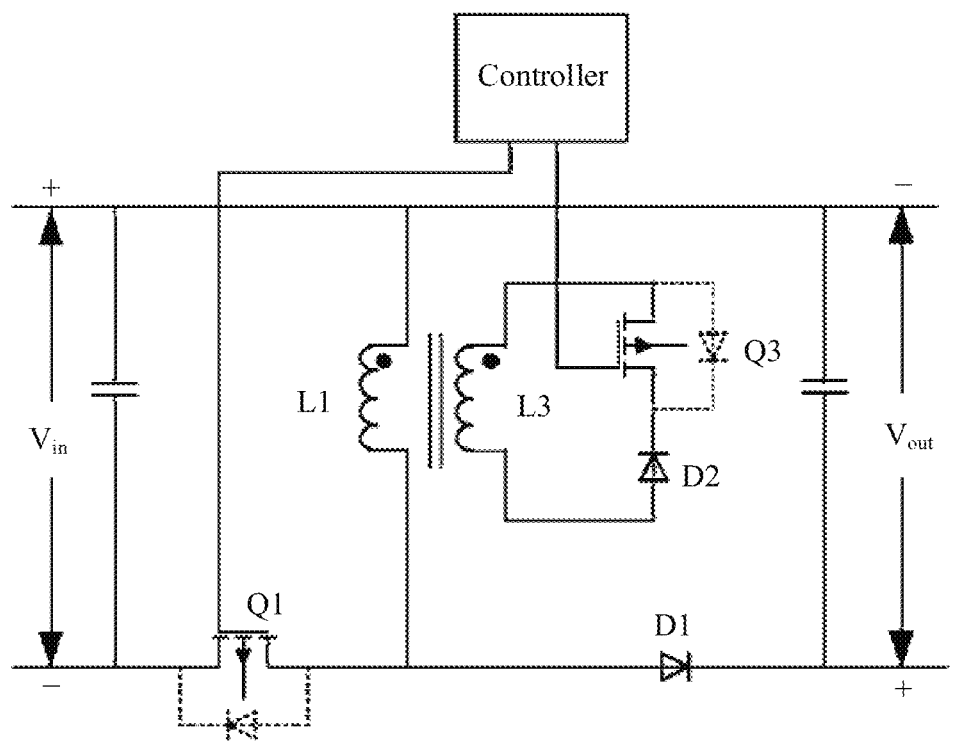
FIG. 3 is a diagram of a topology of still another buck-boost circuit.

For FIG. 3, although an inductor L3 exists in the unidirectional conduction circuit, a function of the inductor L3 is to be magnetically coupled to L1, so that when the unidirectional conduction circuit is conducted, two terminals of L1 are short-circuited by using the inductor L3 for freewheeling, to transfer a current in L1 to L3 for storage. Consequently, zero voltage switching of Q1 cannot be implemented in FIG. 3.

In this embodiment, the leakage inductor is formed after the coupling winding and the power inductor are magnetically coupled. A magnitude of the reverse recovery current of Q2 and energy recovery efficiency may be controlled by setting an absolute value of the leakage inductor; and a resonance time period existing in a case of ZVS may also be controlled by setting the absolute value of the leakage inductor. In addition to the absolute value of the inductance of the leakage inductor, a relative value of the inductance of the leakage inductor, namely, a proportional relationship between the inductance of the leakage inductor and the inductance of the excitation inductor may be set, and a ratio of an operating time period of the resonance circuit to the switching cycle of the main switch Q1 may be controlled by controlling a ratio of the inductance of the leakage inductor to the inductance of the excitation inductor, to control an effective duty cycle of Q1 and an effective value of a current of the power inductor. In addition, a reverse recovery time period of Q2 may be adjusted by setting the magnitude of the leakage inductor. A larger value of the leakage inductor indicates a longer reverse recovery time period, and a smaller corresponding reverse recovery current indicates a smaller corresponding reverse recovery loss. The parasitic capacitor of the main switch Q1 and/or the parasitic capacitor of the first diode Q2 may resonate with the leakage inductor Lr, so that a voltage difference between two terminals of Q1 is close to 0 V, to implement zero voltage switching of Q1, and effectively reduce a loss of Q1.

Figure 9:
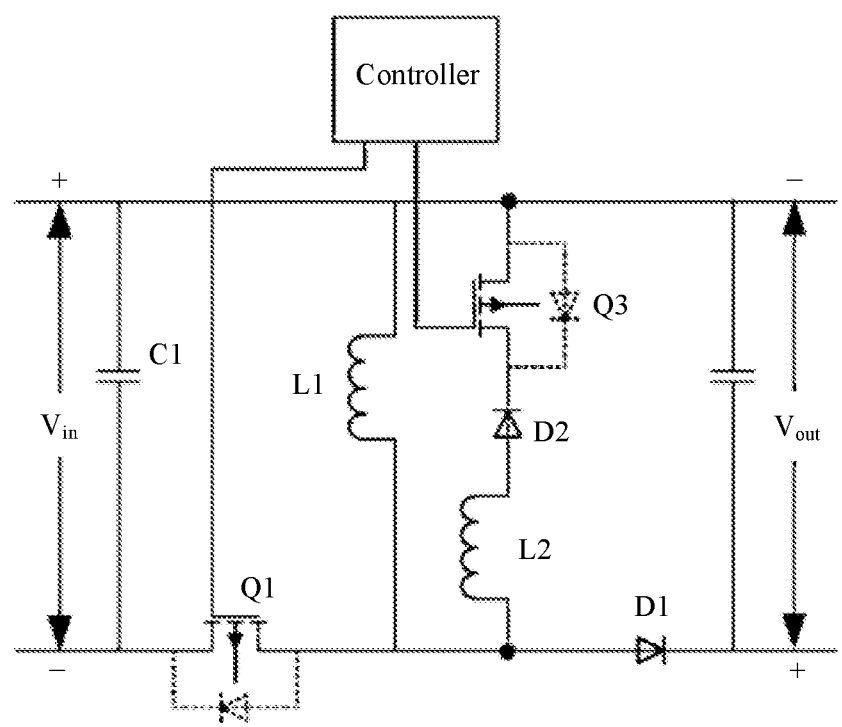
FIG. 9 is a diagram of a circuit topology of a switched-inductor power converter.

With reference to a circuit, in FIG. 9, that may not only be used to reduce a reverse recovery of a diode, but also be used to implement zero voltage switching of Q1, the following analyzes an advantage that is of the circuit provided in FIG. 4 and that is obtained by comparing the circuit provided in FIG. 4 and the circuit provided FIG. 9.

FIG. 9 is a diagram of a circuit topology of a switched-inductor power converter.

The unidirectional conduction branch of the switched-inductor power converter includes a switching transistor Q3, a diode D2, and an inductor L2 that are connected in series.

The converter may not only be used to reduce a reverse recovery loss of a diode D1, but also be used to implement zero voltage switching of the main switch Q1. However, the inductive component L2 is additionally added, and zero voltage switching of Q1 can be implemented only when inductance of L2 is small. The inductor L2 with small inductance has a complex design, and it is difficult to ensure that accuracy of the inductance of L2 meets a requirement. In addition, a branch in which L2 is located needs to be connected in parallel between a positive electrode and a negative electrode of Vin, there is no coupling relationship between L2 and L1, and L2 is a split inductor independent of L1. Therefore, a resonance current generated when L2 resonates with a junction capacitor of Q1 and/or a junction capacitor of D1 is an additional current.

In the converter provided in FIG. 4, the leakage inductor is formed after the coupling winding and the power inductor are magnetically coupled, so that the parasitic capacitor of the main switch and/or the parasitic capacitor of the first diode resonate/resonates with the leakage inductor, to implement zero voltage switching of the main switch. A magnitude of inductance of the leakage inductor may be controlled by setting a coupling relationship between the coupling winding and the power inductor. For example, tight coupling and loose coupling may correspond to different magnitudes of the leakage inductor. For a general transformer (for example, a planar transformer), the inductance of the leakage inductor formed after the power inductor and the coupling winding are magnetically coupled only depends on a machining tolerance of a printed circuit board (PCB, Printed Circuit Board). Therefore, compared with that of the added inductor L2 in FIG. 9, the inductance of the leakage inductor of the converter corresponding to FIG. 4 is controlled more easily and has high stability, and there is great consistency in a resonance condition when the leakage inductor resonates with a capacitor.

Further, when the leakage inductor resonates with the capacitor, zero voltage switching of the main switch is implemented, and a heat dissipation loss of the main switch is reduced, to improve power supply efficiency of the power supply. Therefore, in the switched-inductor power converter provided in this embodiment of this application, not only the reverse recovery loss of the first diode can be effectively reduced by using the leakage inductor, but also a reverse recovery time period and the magnitude of the recovery current of the first diode can be controlled by designing the magnitude of the leakage inductor.

The foregoing describes the operating principle of the converter, and the following describes a specific implementation of the unidirectional conduction circuit in detail in Embodiment 2 of a switched-inductor power converter. The unidirectional conduction circuit is characterized by unidirectional conduction, so that all circuits that may implement unidirectional conduction may be used. The following merely provides specific descriptions.

Figure 10:
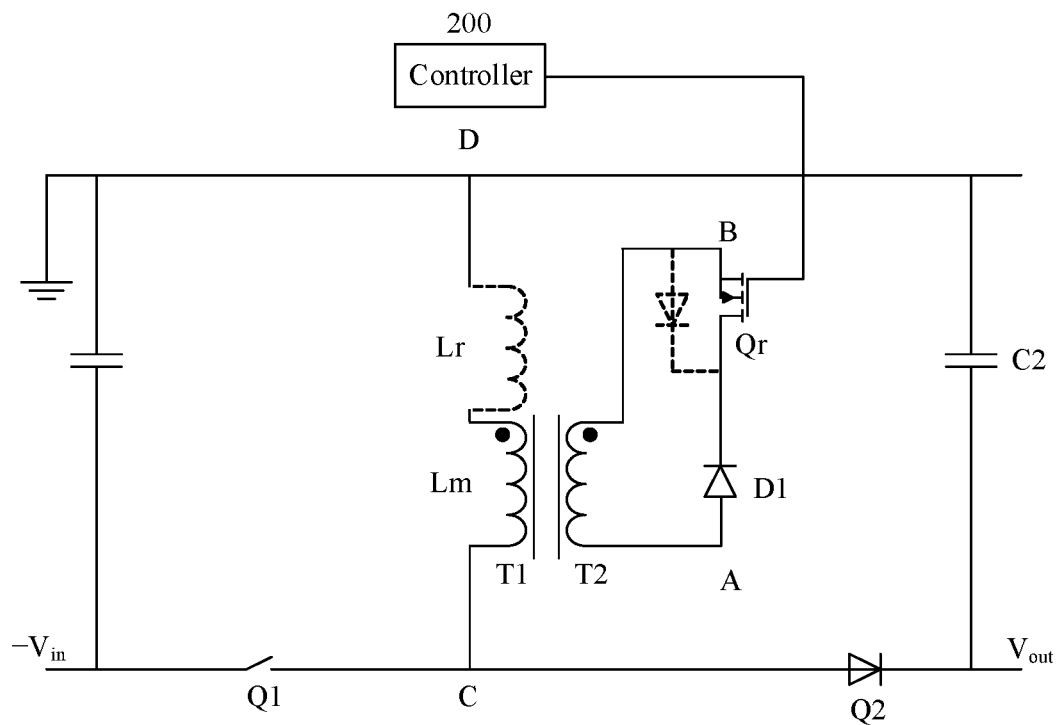
FIG. 10 is a diagram of a circuit topology of another switched-inductor power converter according to an embodiment of this application.

Embodiment 2 of a Switched-Inductor Power Converter:

FIG. 10 is a diagram of a circuit topology of another switched-inductor power converter according to an embodiment of this application.

A unidirectional conduction circuit of the converter includes a switching transistor Qr and a second diode D1 that are connected in series.

A positive electrode of the second diode D1 is close to a second terminal of a coupling winding T2, and a negative electrode of the second diode D1 is close to a first terminal of the coupling winding T2.

Specifically, the negative electrode of D1 is connected to a first terminal of Qr, the positive electrode of D1 is connected to the second terminal of T2, and a second terminal of Qr is connected to the first terminal of T2.

Figure 11:
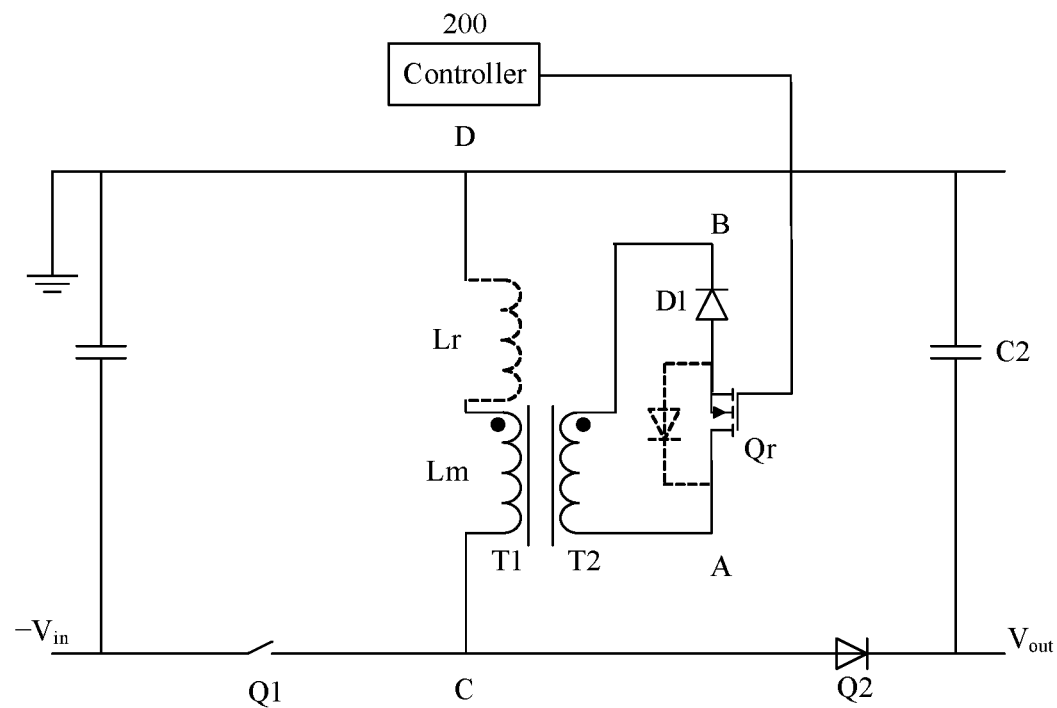
FIG. 11 is a diagram of a circuit topology of still another switched-inductor power converter according to an embodiment of this application.

In addition, the switching transistor and the second diode in the unidirectional conduction circuit may be connected in a connection manner shown in FIG. 11. FIG. 11 is a diagram of a circuit topology of still another switched-inductor power converter according to an embodiment of this application.

A difference between the unidirectional conduction circuit of the converter and the unidirectional conduction circuit of the converter in FIG. 10 is that in the unidirectional conduction circuit of the converter, the negative electrode of the second diode D1 is connected to the first terminal of the coupling winding T2, the positive electrode of D1 is connected to the first terminal of the switching transistor Qr, and the second terminal of Qr is connected to the second terminal of T2.

It can be learned from FIG. 10 and FIG. 11 that a direction of D1 and a direction of a parasitic diode of Qr are opposite directions, and the negative electrode of D1 is close to the first terminal of T2. Therefore, D1 may prevent a current output from the first terminal of T2 to a point B.

In this application, a connection relationship inside the unidirectional conduction circuit is not limited. For ease of description, the following provides detailed descriptions by using a connection relationship shown in FIG. 10 as an example.

A controller 200 is configured to control the switching transistor Qr to be conducted, so that the unidirectional conduction circuit is conducted; and is further configured to control the switching transistor Qr to be cut off, so that the unidirectional conduction circuit is broken. For a time sequence of controlling Q1 and Qr, refer to Embodiment 1 and FIG. 5. A pulse drive signal of Qr corresponds to PWM 2. Details are not described herein.

That the switching transistor in FIG. 10 and FIG. 11 is a MOS transistor is used as an example for description. The switching transistor may be another controllable switching device, for example, a relay. Similarly, Q1 may also be a MOS transistor, or may be another type of controllable switching device.

The unidirectional conduction circuit in the converter described in the foregoing embodiment is a completely independent islanding circuit. In an actual application, to help control the unidirectional conduction circuit, a connection manner of an S electrode of Qr may be selected, so that the controller controls Qr more easily. The following describes two connection manners for driving Qr.

Figure 12:
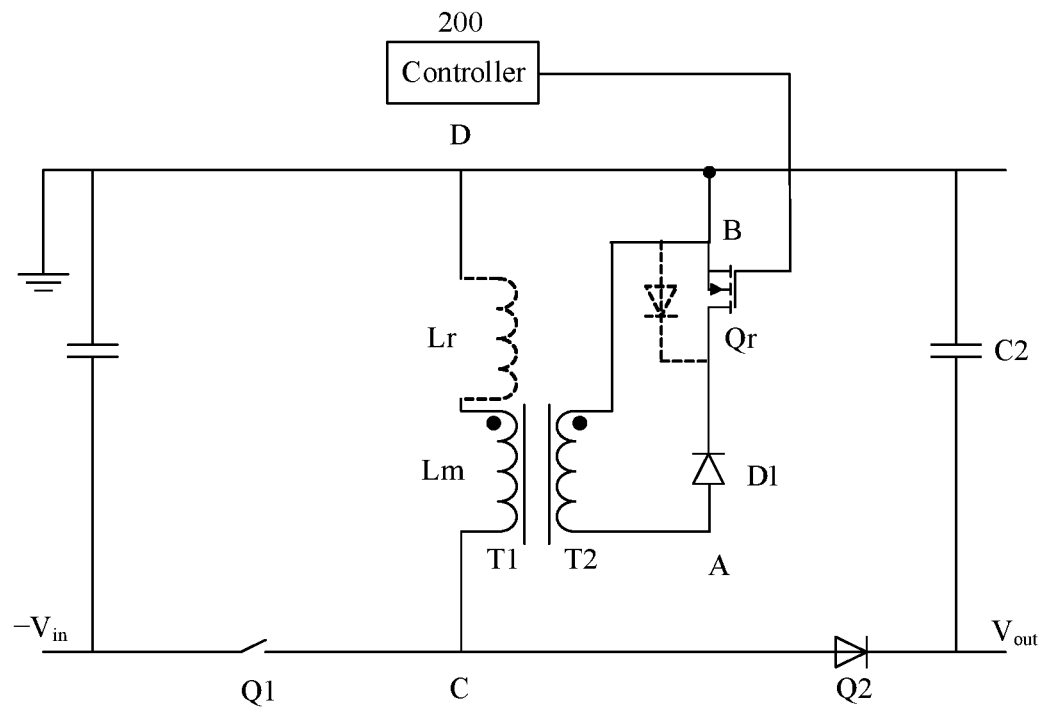
FIG. 12 is a diagram of a circuit of a connection manner of a drive circuit according to an embodiment of this application.

First Manner:

FIG. 12 is a diagram of a circuit of a connection manner of a drive circuit according to an embodiment of this application.

The first terminal of Qr is grounded. For example, when Qr is a MOS transistor, the S electrode of Qr and a ground cable of the converter are connected, so that the S electrode of Qr and the controller may be connected to a same ground, to simplify the pulse drive signal of Qr, and drive Qr more easily.

Figure 13:
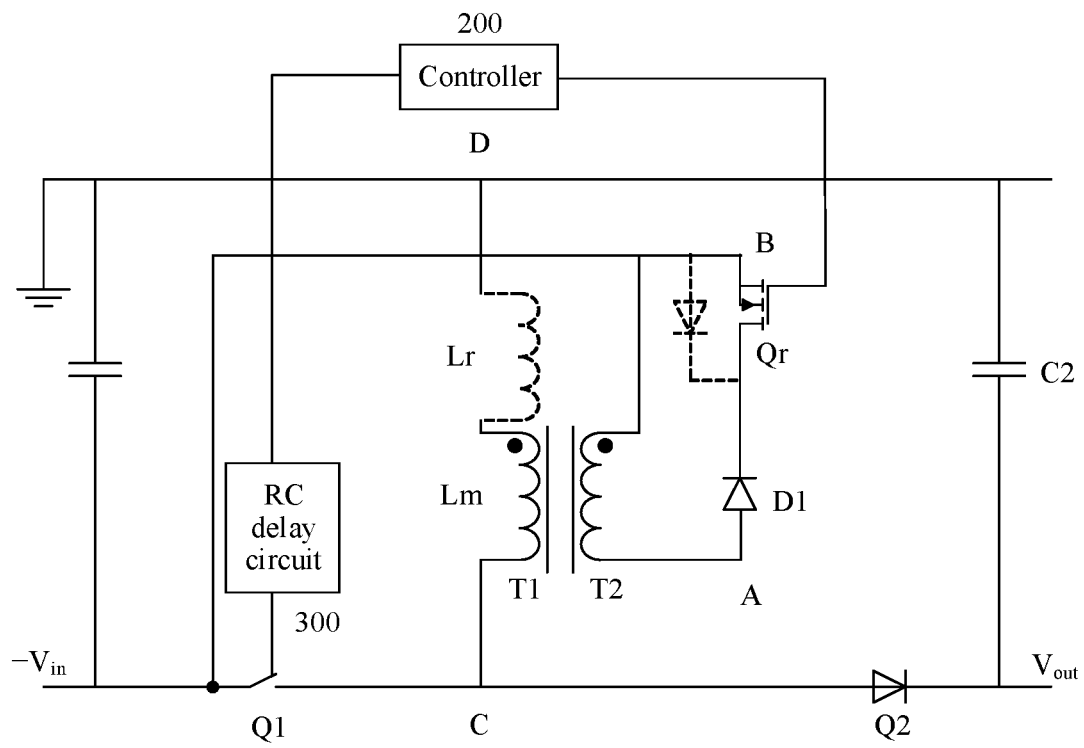
FIG. 13 is a diagram of a circuit of a connection manner of another drive circuit according to an embodiment of this application.

Second Manner:

FIG. 13 is a diagram of a circuit of a connection manner of another drive circuit according to an embodiment of this application.

The first terminal of Qr and Q1 are connected to a same ground. For example, when Q1 is a MOS transistor, the S electrode of Qr and an S electrode of Q1 may be connected to a same ground, so that Qr and Q1 share one controller. The controller 200 controls Qr to be cut off before Q1 is open, and controls Qr to be conducted before Q1 is closed. The controller may directly multiplex a pulse drive signal of the main switch to drive Qr. Therefore, a pulse drive signal does not need to be additionally added.

Therefore, in the second connection manner, the controller may directly multiplex the pulse drive signal of Q1 to drive Qr. Therefore, a pulse drive signal does not need to be additionally added.

The foregoing describes the connection manners of two drive circuits, and the following describes a driving manner of Qr.

With reference to FIG. 5, the controller 200 may delay, for a preset time period, a pulse drive signal provided to Q1, to provide the pulse drive signal to Qr. The controller may provide the pulse drive signal to Qr, to control Qr to be conducted before Q1 is closed, and to control Qr to be cut off before Q1 is open. The preset time period may be (t2-t1).

As shown in FIG. 12, to delay, for the preset time period, the pulse drive signal provided by the controller, the converter may further include an RC delay circuit 300. The RC delay circuit 300 is configured to delay, for the preset time period, the pulse drive signal provided by the controller to the switching transistor Qr, to provide the pulse drive signal to the main switch Q1.

To not affect a duty cycle of the main switch and an effective value of a current of a power inductor, in each switching cycle of Q1, the controller 200 controls Qr to be conducted before Q1 is closed, and controls, to be less than or equal to 5% of the switching cycle, a time period existing after Qr is conducted and before the main switch Q1 is closed. With reference to FIG. 5, the switching cycle may be (t5-t1), and the time period existing after Qr is conducted and before the main switch Q1 is closed may be ((t5-t1)/20).

In the converter, the RC delay circuit 300 is used to delay, for the preset time period, the pulse drive signal provided by the controller to the switching transistor Qr, to provide the pulse drive signal to the main switch Q1, so as to drive Qr without a need to design a complex pulse drive signal. In addition, a delay function provided by the controller may be used to delay, for the preset time period, the pulse drive signal provided to the switching transistor Qr, to provide the pulse drive signal to the main switch Q1.

In addition, a leakage inductor provided in this embodiment of this application may further implement a reverse recovery of D1 in FIG. 10 and FIG. 11. When Q1 is closed, a voltage stress of the reverse recovery of D1 may be reduced by the leakage inductor. Lr may control a current flowing through D1, and only when D1 has a minimum current, Q1 is controlled to be closed. In this way, a reverse recovery point of D1 can be controlled. However, in FIG. 2 and FIG. 3, a voltage stress of a reverse recovery of a diode in the unidirectional conduction circuit cannot be suppressed.

The types of the converters described in the foregoing embodiments each are a non-isolated converter. The technical solutions provided in this application may be further applied to an isolated converter. The following provides detailed descriptions by using an example in which a type of the isolated converter is a forward circuit.

Figure 14:
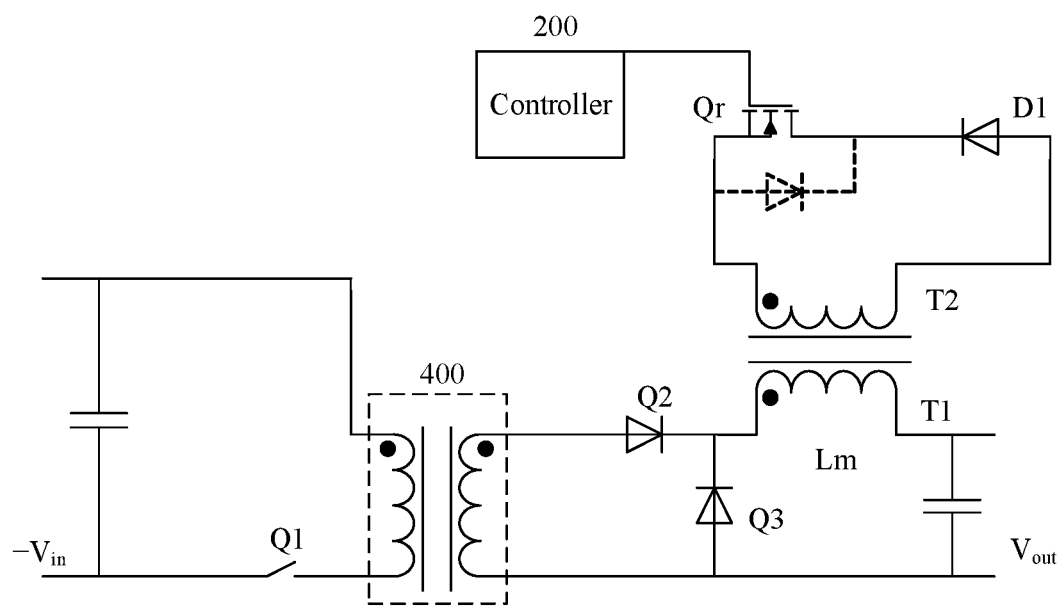
FIG. 14 is a diagram of a circuit topology of yet another switched-inductor power converter according to an embodiment of this application.

Embodiment 3 of a Switched-Inductor Power Converter:

FIG. 14 is a diagram of a circuit topology of yet another switched-inductor power converter according to an embodiment of this application.

In a comparison between an isolated converter and a non-isolated converter, the isolated converter further includes an isolation transformer 400.

A main switch Q1 is located on a primary side circuit of the isolation transformer 400, a first diode Q2 is located on a secondary side circuit of the isolation transformer 400, and the secondary side circuit includes a third diode Q3.

One terminal that is of a primary-side winding of the isolation transformer 400 and that is connected to a positive electrode of a power supply and a first terminal of a secondary-side winding of the isolation transformer 400 are dotted terminals. A first terminal of Q1 is connected to a negative electrode of the power supply, and a second terminal of Q1 is connected to a second terminal of the primary-side winding of the isolation transformer 400. A negative electrode of Q2 is connected to the first terminal of the secondary-side winding of the isolation transformer 400, and a positive electrode of Q2 is connected to a first terminal of a power inductor T1. A positive electrode of Q3 is connected to the positive electrode of Q2, and a negative electrode of Q3 is connected to a second terminal of the secondary-side winding of the isolation transformer 400.

An operating principle of the isolated converter is similar to an operating principle of the non-isolated converter. For a specific operating principle, refer to Embodiment 1 of a switched-inductor power converter. Details are not described herein again.

In comparison with the non-isolated converter, the isolation transformer 400 in the isolated converter may electrically isolate the primary side circuit and the secondary side circuit of the isolation transformer 400, to reduce mutual signal interference between the primary side circuit and the secondary side circuit.

Similar to those shown in FIG. 12 and FIG. 13, the foregoing grounding manner may also be used for the isolated converter. The following describes two specific connection manners for driving Qr.

Figure 15:
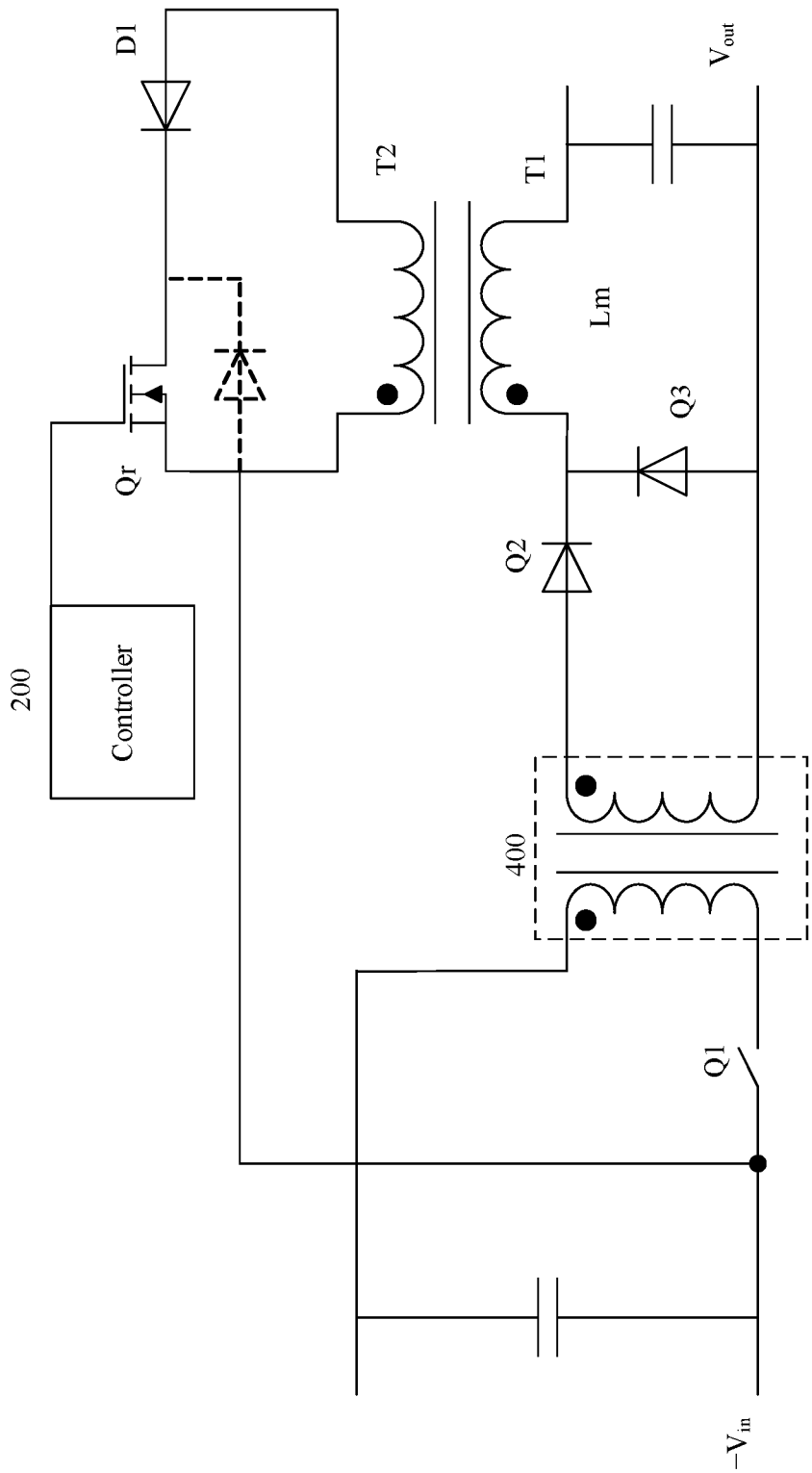
FIG. 15 is a diagram of a circuit of a connection manner of still another drive circuit according to an embodiment of this application.

First Manner:

FIG. 15 is a diagram of a circuit of a connection manner of still another drive circuit according to an embodiment of this application.

A first terminal of a switching transistor Qr is connected to the ground of the primary-side winding of the isolation transformer 400, so that Qr and Q1 can share one controller. A controller 200 controls Qr to be cut off before Q1 is open, and controls Qr to be conducted before Q1 is closed. The controller 200 may directly multiplex a pulse drive signal of the main switch to drive Qr. Therefore, a pulse drive signal does not need to be additionally added.

Therefore, in the first connection manner, the controller 200 may directly multiplex a pulse drive signal of Q1 to drive Qr. Therefore, a pulse drive signal does not need to be additionally added.

Figure 16:
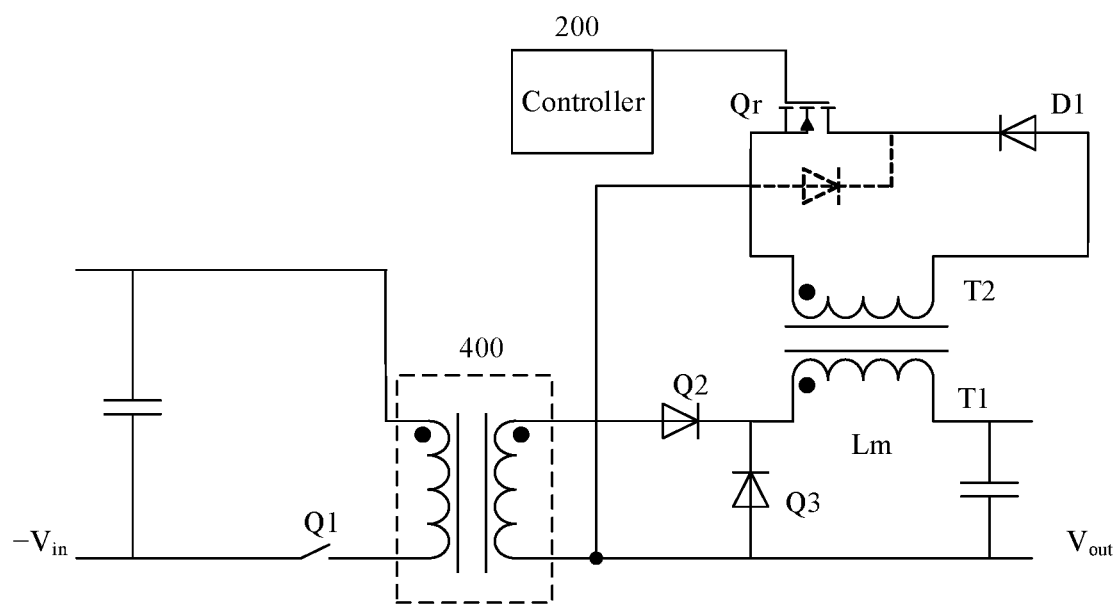
FIG. 16 is a diagram of a circuit of a connection manner of yet another drive circuit according to an embodiment of this application.

Second Manner:

FIG. 16 is a diagram of a circuit of a connection manner of yet another drive circuit according to an embodiment of this application.

A first terminal of a switching transistor Qr is connected to the ground of the secondary-side winding of the isolation transformer 400, so that an S electrode of Qr and a controller 200 can be connected to a same ground, to simplify a pulse drive signal of Qr, and drive Qr more easily.

Similar to those shown in FIG. 12 and FIG. 13, in the isolated converter, the foregoing driving manners may be used to drive Qr. For a specific driving manner, refer to Embodiment 2 of a switched-inductor power converter. Details are not described herein again.

The isolation transformer is disposed between an input terminal and an output terminal of the converter. Because the primary side winding and the secondary side winding of the isolation transformer are electrically isolated from each other, mutual signal interference between the primary side circuit and the secondary side circuit of the isolation transformer may be reduced.

Based on the converter provided in embodiments, an embodiment of this application further provides a communication system. The following describes the communication system in detail with reference to accompanying drawings.

Figure 17:
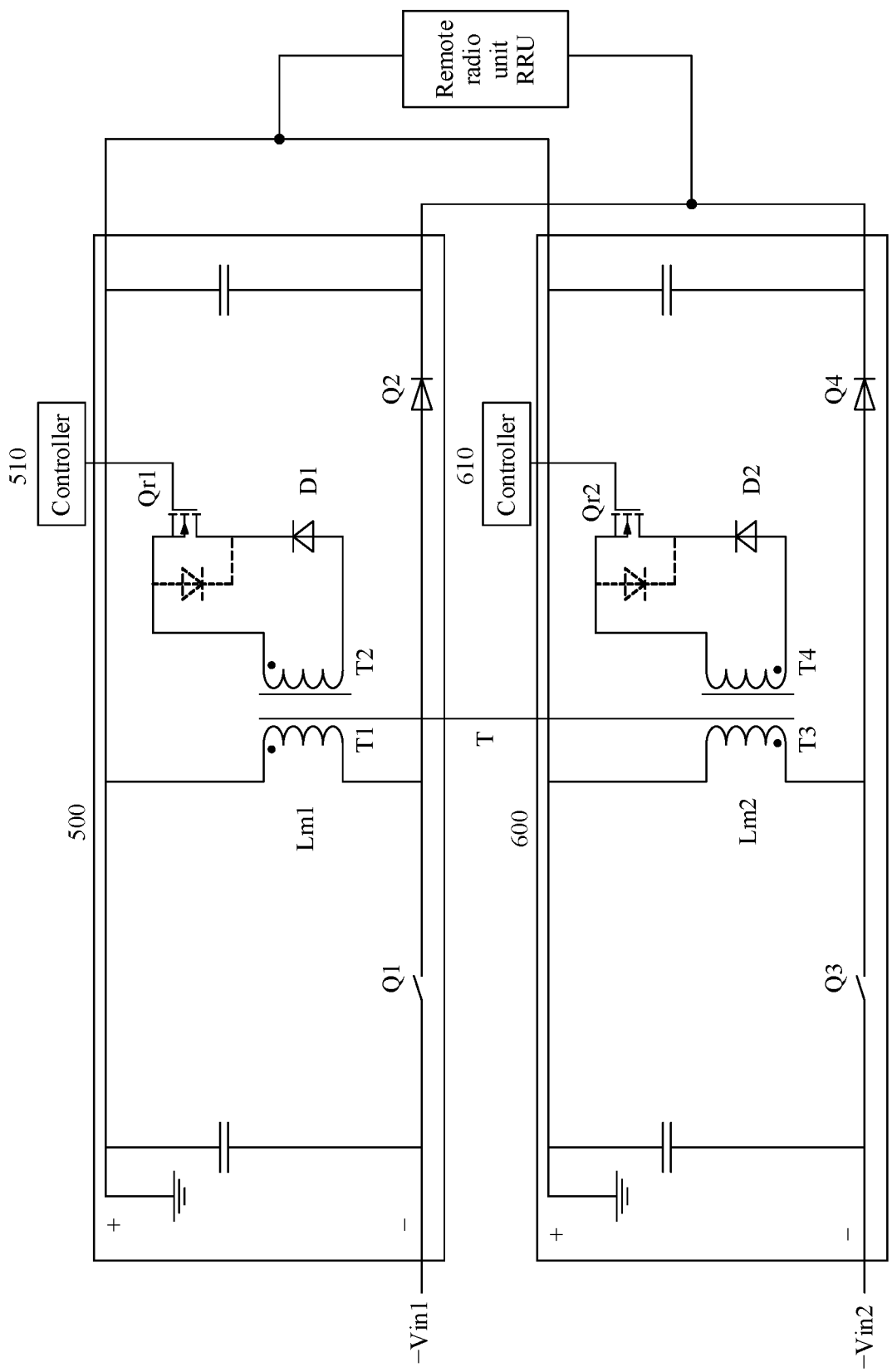
FIG. 17 is a schematic diagram of a communication system according to an embodiment of this application.

Embodiment 1 of the Communication System:

FIG. 17 is a schematic diagram of a communication system according to an embodiment of this application.

A power supply of the communication system usually includes two phases or three phases, each phase includes the converter described in the foregoing embodiments. For ease of understanding, the following provides detailed description by using an example in which the power supply of the communication system includes two phases.

The communication system includes a remote radio unit (RRU, Remote Radio Unit), a first converter 500, and a second converter 600.

In this embodiment, that the first converter 500 and the second converter 600 each has a buck-boost topology is still used as an example for description. Certainly, a converter in the communication system may also be another non-isolated converter described in the foregoing converter embodiments, or may be an isolated converter described in the foregoing converter embodiments.

The first converter 500 includes a first main switch Q1, a first power inductor T1, a first coupling winding T2, an excitation inductor Lm1 formed after T1 and T2 are magnetically coupled, a first diode Q2, a second diode D1, a first switching transistor Qr1, and a first controller 510.

The second converter 600 includes a second main switch Q3, a second power inductor T3, a second coupling winding T4, an excitation inductor Lm2 formed after T3 and T4 are magnetically coupled, a third diode Q4, a fourth diode D2, a second switching transistor Qr2, and a second controller 610.

T1 and T2 in the first converter 500 are magnetically coupled by using a magnetic core T, and T3 and T4 in the second converter 600 are magnetically coupled by using the magnetic core T. In other words, the first converter 500 and the second converter 600 may share a same magnetic core T, so that a volume of the entire power supply can be reduced, and occupied space of the power supply can be reduced.

The first converter 500 is controlled by a first controller 510, and the second converter 600 is controlled by a second controller 610. Specifically, the first controller 510 is configured to: control Qr1 to be conducted before Q1 is closed, and control Qr1 to be cut off before Q1 is open. The second controller 610 is configured to: control Qr2 to be conducted before Q3 is conducted, and control Qr2 to be cut off before Q3 is cut off.

An output terminal of each of the first converter 500 and the second converter 600 is used to supply power to the RRU.

A communication power supply usually supplies power by using a negative voltage, so that electrolysis can be reduced, and anti-corrosion is performed. As shown in FIG. 17, a positive electrode of the power supply is grounded, a negative electrode of the first converter 500 is connected to a first voltage-Vin1 of the power supply, and a positive electrode of the first converter 500 is connected to the positive electrode of the power supply. A negative electrode of the second converter 600 is connected to a second voltage-Vin2 of the power supply, and a positive electrode of the second converter 600 is connected to the positive electrode of the power supply. The first voltage-Vin1 may be one phase voltage provided by the power supply, and the second voltage-Vin2 may be the other phase voltage provided by the power supply.

Input terminals of the first converter 500 and the second converter 600 are respectively connected to the first voltage-Vin1 and the second voltage-Vin2 that are phase-shifted and that are of the power supply, so that a ripple of a current output by the power supply can be suppressed, and quality of power supplied to the RRU can be improved. In this embodiment, a phase angle at which phase-shifting is performed is not specifically limited, for example, may be any one of the following types: 90°, 120°, and 180°. The ripple of the current may be well reduced when phases of a two-phase power supply that are connected to the input terminal of the first converter 500 and the second converter 600 have a phase shift of 180°.

The communication system includes the foregoing described converter, a leakage inductor is formed after a coupling winding and a power inductor in the converter are magnetically coupled. A coupling relationship between the coupling winding and the power inductor is set, to obtain a ratio between the inductance of the leakage inductor and the inductance of a magnetically coupled excitation inductor, and further, control a reverse recovery speed and a magnitude of a recovery current of the diode, so as to reduce a reverse recovery loss of the first diode. The leakage inductor may resonate with a parasitic capacitor of a main switch and/or a parasitic capacitor of the first diode, so that a voltage difference between two terminals of the main switch is close to 0 V, to implement zero voltage switching of the main switch, and effectively reduce a loss of the main switch. Therefore, when the communication system including the converter is used to supply power to the remote radio unit, an energy loss generated in a power supply process of the communication system can be reduced, and power supply efficiency of the communication system can be improved.

Based on the converter and the communication system provided in the foregoing embodiments, an embodiment of this application further provides a control method for a switched-inductor power converter. The method may be specifically performed by a controller of the converter. The following provides detailed descriptions with reference to accompanying drawings.

Figure 18:
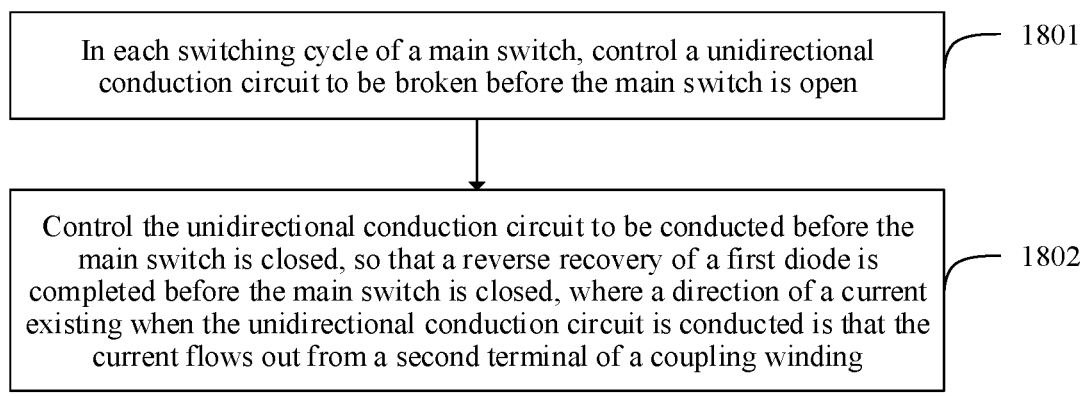
FIG. 18 is a flowchart of a control method for a switched-inductor power converter according to an embodiment of this application.

Embodiment 1 of a Control Method:

FIG. 18 is a flowchart of a control method for a switched-inductor power converter according to an embodiment of this application.

The converter provided in this embodiment includes a coupling winding and a unidirectional conduction circuit, and the coupling winding and the unidirectional conduction circuit are connected in series to form a closed loop. A leakage inductor is formed after the coupling winding and a power inductor are magnetically coupled.

The Control Method for the Converter Includes the Following Steps:

Step 1801: In each switching cycle of a main switch, control the unidirectional conduction circuit to be broken before the main switch is open.

Step 1802: Control the unidirectional conduction circuit to be conducted before the main switch is closed, so that a reverse recovery of a first diode is completed before the main switch is closed, where a direction of a current existing when the unidirectional conduction circuit is conducted is that the current flows out from a second terminal of the coupling winding.

The foregoing only provides descriptions by using one switching cycle of the main switch as an example. A same control manner is used in each switching cycle. Details are not described herein.

In the control method, the unidirectional conduction circuit is broken before the main switch is open, and the unidirectional conduction circuit is conducted before the main switch is closed. The unidirectional conduction circuit may be used to resolve a reverse recovery problem that is of a diode and that exists before the main switch is closed. The leakage inductor is formed after the coupling winding and the power inductor are magnetically coupled. Existence of the leakage inductor and the unidirectional conduction circuit may suppress a reverse recovery stress of the first diode, to further reduce a reverse recovery current of the first diode, and reduce a reverse recovery loss of the first diode. In addition, the leakage inductor resonates with a junction capacitor of the main switch, and/or the leakage inductor resonates with a junction capacitor of the diode, to implement zero voltage switching of the main switch. Therefore, the converter may not only be used to reduce the reverse recovery loss of the diode, but also be used to implement zero voltage switching of the main switch.

It should be understood that in embodiments of this application, "at least one (item)" means one or more, and "a plurality of" means two or more. "And/or" is used to describe an association relationship between associated objects, and indicates that three relationships may exist. For example, "A and/or B" may indicate that only A exists, only B exists, and both A and B exist. Herein, A or B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A switched-inductor power converter, comprising: a main switch, a power inductor, a coupling winding, a unidirectional conduction circuit, a first diode, and a controller, wherein:

when the main switch is closed, the power inductor stores energy from a power supply, when the main switch is open, the power inductor is disconnected from the power supply to release energy, and the first diode provides a freewheeling path when the power inductor releases the energy;

the coupling winding and the power inductor are magnetically coupled, and a leakage inductor is formed after the coupling winding and the power inductor are magnetically coupled;

a first terminal of the unidirectional conduction circuit is connected to a first terminal of the coupling winding, and a second terminal of the unidirectional conduction circuit is connected to a second terminal of the coupling winding, and one terminal that is of the power inductor and that is connected to a positive electrode of the power supply and the first terminal of the coupling winding are dotted terminals;

the controller is configured to: in each switching cycle of the main switch, control the unidirectional conduction circuit to be broken before the main switch is open, and is further configured to control the unidirectional conduction circuit to be conducted before the main switch is closed, wherein a direction of a current existing when the unidirectional conduction circuit is conducted is that the current flows out from the second terminal of the coupling winding; and the leakage inductor is configured to resonate with a parasitic capacitor of the main switch and/or a parasitic capacitor of the first diode when the unidirectional conduction circuit is conducted, wherein a ratio of inductance of the leakage inductor to inductance of a magnetically coupled excitation inductor is less than 10%, and a time period existing after the unidirectional conduction circuit is conducted and before the main switch is closed is less than or equal to 5% of the switching cycle.

2. The converter according to claim 1, wherein the unidirectional conduction circuit comprises a switching transistor and a second diode that are connected in series;

wherein a positive electrode of the second diode is close to the second terminal of the coupling winding, and a negative electrode of the second diode is close to the first terminal of the coupling winding; and wherein the controller is configured to control the switching transistor to be conducted, so that the unidirectional conduction circuit is conducted, and is further configured to control the switching transistor to be cut off, so that the unidirectional conduction circuit is broken.

3. The converter according to claim 2, wherein a first terminal of the switching transistor is connected to the first terminal of the coupling winding, a second terminal of the switching transistor is connected to the negative electrode of the second diode, and the positive electrode of the second diode is connected to the second terminal of the coupling winding.

4. The converter according to claim 3, wherein when the converter is a non-isolated converter, the first terminal of the switching transistor is grounded.

5. The converter according to claim 3, wherein when the converter is a non-isolated converter, the first terminal of the switching transistor and the main switch are connected to a same ground.

6. The converter according to claim 2, wherein a pulse drive signal of the main switch and a pulse drive signal of the switching transistor have a same period and duty cycle, and compared with the pulse drive signal of the switching transistor, the pulse drive signal of the main switch is delayed for a preset time period.

7. The converter according to claim 6, wherein the converter further comprises an RC delay circuit, and the RC delay circuit is configured to delay the pulse drive signal to the main switch for the preset time period.

8. The converter according to claim 1, wherein the converter comprises any one of the following circuits: a buck circuit, a boost circuit, a buck-boost circuit, a Cuk circuit, a Sepic circuit, or a Zeta circuit.

9. The converter according to claim 3, wherein when the converter is an isolated converter, the converter comprises an isolation transformer; and
  wherein the first terminal of the switching transistor is connected to the ground of a primary-side winding of the isolation transformer.

10. The converter according to claim 3, wherein when the converter is an isolated converter, the converter comprises an isolation transformer; and
  wherein the first terminal of the switching transistor is connected to the ground of a secondary-side winding of the isolation transformer.

11. The method according to claim 9, wherein the isolated converter comprises any one of the following circuits:
  a flyback circuit, a forward circuit, a half-bridge circuit, a full-bridge circuit, or a push-pull circuit.

12. The converter according to claim 1, wherein the power inductor is any one of the following types:
  a planar inductor, a discrete inductor, or a multi-phase coupled inductor.

13. A communication system, wherein the communication system comprises:
  a remote radio unit (RRU); and
  a switched-inductor power converter;
  wherein a positive electrode of the converter is connected to a positive electrode of a power supply, a negative electrode of the converter is connected to a negative electrode of the power supply, the positive electrode of the power supply is ground, and the negative electrode of the power supply is configured to provide a negative voltage; and
  wherein an output terminal of the converter is configured to supply power to the RRU, wherein the switched-inductor power converter, comprises: a main switch, a power inductor, a coupling winding, a unidirectional conduction circuit, a first diode, and a controller, wherein:
  when the main switch is closed, the power inductor stores energy from a power supply, when the main switch is open, the power inductor is disconnected from the power supply to release energy, and the first diode provides a freewheeling path when the power inductor releases the energy;
  the coupling winding and the power inductor are magnetically coupled, and a leakage inductor is formed after the coupling winding and the power inductor are magnetically coupled;
  a first terminal of the unidirectional conduction circuit is connected to a first terminal of the coupling winding, and a second terminal of the unidirectional conduction circuit is connected to a second terminal of the coupling winding, and one terminal that is of the power inductor and that is connected to a positive electrode of the power supply and the first terminal of the coupling winding are dotted terminals;
  the controller is configured to: in each switching cycle of the main switch, control the unidirectional conduction circuit to be broken before the main switch is open, and is further configured to control the unidirectional conduction circuit to be conducted before the main switch is closed, wherein a direction of a current existing when the unidirectional conduction circuit is conducted is that the current flows out from the second terminal of the coupling winding; and
  the leakage inductor is configured to resonate with a parasitic capacitor of the main switch and/or a parasitic capacitor of the first diode when the unidirectional conduction circuit is conducted,
  wherein a ratio of inductance of the leakage inductor to inductance of a magnetically coupled excitation inductor is less than 10%, and a time period existing after the unidirectional conduction circuit is conducted and before the main switch is closed is less than or equal to 5% of the switching cycle.

14. The communication system according to claim 13, wherein the coupling winding and the power inductor in the converter are magnetically coupled by using a magnetic core; and
  wherein the power supply includes two or more phases, each phase of the power supply comprises one converter, and converters of all phases share a same magnetic core.

15. The communication system according to claim 14, wherein phases are sequentially preset for negative voltages connected to all phases of the power supply in a phase-shifted manner.

16. The communication system according to claim 13, wherein the unidirectional conduction circuit comprises a switching transistor and a second diode that are connected in series;
  wherein a positive electrode of the second diode is close to the second terminal of the coupling winding, and a negative electrode of the second diode is close to the first terminal of the coupling winding; and
  wherein the controller is configured to control the switching transistor to be conducted, so that the unidirectional conduction circuit is conducted, and is further configured to control the switching transistor to be cut off, so that the unidirectional conduction circuit is broken.

17. The communication system according to claim 16, wherein a first terminal of the switching transistor is connected to the first terminal of the coupling winding, a second terminal of the switching transistor is connected to the negative electrode of the second diode, and the positive electrode of the second diode is connected to the second terminal of the coupling winding.

18. The communication system according to claim 17, wherein when the converter is a non-isolated converter, the first terminal of the switching transistor is grounded.

19. The communication system according to claim 17, wherein when the converter is a non-isolated converter, the first terminal of the switching transistor and the main switch are connected to a same ground.

20. A control method for a switched-inductor power converter, wherein the switched-inductor power converter, comprises: a main switch, a power inductor, a coupling winding, a unidirectional conduction circuit, a first diode, and a controller, wherein:
- when the main switch is closed, the power inductor stores energy from a power supply, when the main switch is open, the power inductor is disconnected from the power supply to release energy, and the first diode provides a freewheeling path when the power inductor releases the energy;
- the coupling winding and the power inductor are magnetically coupled, and a leakage inductor is formed after the coupling winding and the power inductor are magnetically coupled;
- a first terminal of the unidirectional conduction circuit is connected to a first terminal of the coupling winding, and a second terminal of the unidirectional conduction circuit is connected to a second terminal of the coupling winding; and one terminal that is of the power inductor and that is connected to a positive electrode of the power supply and the first terminal of the coupling winding are dotted terminals;
- the controller is configured to: in each switching cycle of the main switch, control the unidirectional conduction circuit to be broken before the main switch is open, and is further configured to control the unidirectional conduction circuit to be conducted before the main switch is closed, wherein a direction of a current existing when the unidirectional conduction circuit is conducted is that the current flows out from the second terminal of the coupling winding; and
- the leakage inductor is configured to resonate with a parasitic capacitor of the main switch and/or a parasitic capacitor of the first diode when the unidirectional conduction circuit is conducted,
- wherein a ratio of inductance of the leakage inductor to inductance of a magnetically coupled excitation inductor is less than 10%, and a time period existing after the unidirectional conduction circuit is conducted and before the main switch is closed is less than or equal to 5% of the switching cycle.

* * * * *